_(12)_ United States Patent
Potts et al.

(10) Patent No.: US 7,458,064 B2
(45) Date of Patent: Nov. 25, 2008

(54) METHODS AND APPARATUS FOR GENERATING A WORK ITEM IN A BUG TRACKING SYSTEM

(75) Inventors: Richard D. Potts, Cary, NC (US); William H. Barnett, Chapel Hill, NC (US)

(73) Assignee: Microsoft Corporation, Redmond, WA (US)

( * ) Notice: Subject to any disclaimer, the term of this patent is extended or adjusted under 35 U.S.C. 154(b) by 632 days.

(21) Appl. No.: 11/103,300

(22) Filed: Apr. 11, 2005

(65) Prior Publication Data

US 2006/0230384 A1    Oct. 12, 2006

(51) Int. Cl.
*G06F 9/44* (2006.01)

(52) U.S. Cl. .................................................... 717/124
(58) Field of Classification Search .......... 717/123–129
See application file for complete search history.

(56) References Cited

U.S. PATENT DOCUMENTS

| | | | |
|---|---|---|---|
| 4,852,047 A | 7/1989 | Lavallee et al. | |
| 6,275,980 B1* | 8/2001 | Uchihira et al. | 717/124 |
| 6,741,071 B2* | 5/2004 | Delcourt et al. | 324/158.1 |
| 6,944,849 B1* | 9/2005 | Glerum et al. | 717/127 |
| 6,978,441 B2* | 12/2005 | Atwood et al. | 717/125 |
| 7,055,067 B2* | 5/2006 | DiJoseph | 714/38 |
| 7,093,238 B2* | 8/2006 | Givoni et al. | 717/129 |
| 7,100,152 B1* | 8/2006 | Birum et al. | 717/131 |
| 7,194,664 B1* | 3/2007 | Fung et al. | 714/45 |
| 7,299,451 B2* | 11/2007 | Dygon et al. | 717/124 |
| 7,299,455 B2* | 11/2007 | Anderson et al. | 717/127 |
| 2002/0049962 A1 | 4/2002 | Kelbaugh et al. | |
| 2003/0066049 A1 | 4/2003 | Atwood et al. | |
| 2003/0188298 A1* | 10/2003 | Shaposhnick | 717/141 |
| 2003/0203400 A1* | 10/2003 | Strehlau et al. | 435/7.1 |
| 2004/0107415 A1* | 6/2004 | Melamed et al. | 717/124 |

OTHER PUBLICATIONS

Ur et al. "Micro Architecture Coverage Directed Generation of Test Programs", Jun. 1999, ACM, pp. 1-6.*
Liblit et al. "Bug Isolation via Remote Program sampling", Jun. 2003, ACM, pp. 141-154.*
Rutherford et al. "A Case for Test-Code Generation in Model-Driven Systems", Sep. 2003, pp. 377-396.*
International Search Report from a corresponding International Application PCT/US 06/09243, filed Mar. 15, 2006.

\* cited by examiner

*Primary Examiner*—Wei Y Zhen
*Assistant Examiner*—Anna Deng
(74) *Attorney, Agent, or Firm*—Wolf, Greenfield & Sacks, P.C.

(57) ABSTRACT

In one aspect, a method and apparatus for displaying to a user at least one test result obtained from a location in a database, receiving an indication from the user to generate at least one work item associated with the at least one test result, and automatically attaching to the work item test information associated with the at least one test result is provided. In another aspect, the test information includes location information corresponding to a location of the at least one test result in the database. In a further aspect, a utility adapted to access test results in the database is provided and wherein the test information includes state information associated with a state of the utility at the time the at least one work item was generated.

10 Claims, 3 Drawing Sheets

METHODS AND APPARATUS FOR GENERATING A WORK ITEM IN A BUG TRACKING SYSTEM

FIELD OF THE INVENTION

The present invention relates testing of an application and more particularly to sharing of test information between one or more operators associated with the development of the application.

BACKGROUND OF THE INVENTION

Prior to a software application being released to users or before being made publicly available, the software application is typically tested under a variety of conditions to ensure that the application performs as expected. For example, load testing and/or code coverage analysis may be employed to test the robustness of an application. Load testing simulates various load conditions that the application may encounter during operation. For example, a web-based application may need to support tens, hundreds, thousands or more concurrent users. Load testing provides a mechanism for determining stability under varying loads, and/or identifying performance issues in the application and/or hardware and software infrastructure, prior to the application being put into production and ultimately released to end users.

A load test may exercise the code of the application as well as test desired combinations of hardware and software components in an application's infrastructure. As the load test executes, performance information is collected on the operation of the application and infrastructure. Performance information may include response time as a function of load, resource utilization, errors and/or failures, etc. For example, in the context of a corporate website being tested before the website is made accessible over the Internet, the performance information may include data such as average response time for the website's home page to load, average time to navigate through a designated portion of the website, the amount of memory being used on the web server over time, presence of one or more errors, occurrence of a failure, etc. This information may be analyzed to fix problems, improve performance or otherwise modify the application and/or infrastructure. The various tests frequently performed on applications in development often generate relatively large amounts of data that are then stored in a database to be viewed, analyzed and/or distributed.

In conventional software and/or hardware development environments, roles may be divided between a development team comprising one or more developers and a testing team (often referred to as quality assurance (QA)) comprising one or more test engineers. A test engineer may be responsible for running various tests (e.g., load tests) on the application, generating test results, identifying issues and/or bugs in the application and distributing the test results and/or bug reports to the developer. While a developer may conduct various unit tests on code that he or she has written, in general, the bulk of the testing (particularly on software release candidates) may be handled by test engineers who are not themselves developing code, implementing bug fixes, etc. As a result, a test engineer must convey to the developer(s) the information obtained during testing of the application so that the appropriate fixes and/or improvements to the code may be implemented. That is, some form of information sharing between QA and development is typically conducted.

The sharing and distribution of such information is often performed, at least in part, using a bug tracking system. A test engineer may identify a bug during testing of the application and generate a work item or bug report that provides information to facilitate the developer in providing a bug fix. The term "bug" refers herein to any perceived issue with an application or infrastructure identified during testing of the application. For example, a bug may be any failure, fault or error encountered during operation of the application. In addition, a bug may include operation of the application that deviates from the design specification and/or that fails to function as expected or perform as intended.

A work item generated by a test engineer may be distributed to an appropriate developer to notify the developer of the existence of the bug. The term "work item" refers generally to any notification to a developer that there is an outstanding issue with an application that should be addressed. A work item may be an e-mail sent to a developer or may be an entry or record stored in a repository that can be viewed and accessed by the developers working on the application. Test results obtained by a test engineer may be important for a developer to gain an understanding of the problem so that a proper fix can be implemented. To facilitate the developer, the test engineer may manually provide a network path that locates the test results in the repository or database in which the results are stored, so that the developer may access the appropriate test results associated with the work item. In addition, to communicate any other information that the test engineer perceives as relevant to the bug, the test engineer manually inputs the information into the work item to convey it to the developer(s).

SUMMARY OF THE INVENTION

To facilitate sharing of information between test engineers and software developers, test information may be automatically attached upon generation of a work item. For example, a bug tracking system, at least to some extent, may be integrated with one or more utilities that permit viewing and/or manipulation of test results stored in a database. The utility may include one or more interfaces that allow a test engineer to make a gesture to generate a new work item. Since the new work item is created in the context of the utility, test information may be automatically attached to the work item without placing the burden on the test engineer to manually include the test information, reducing the likelihood of error and facilitating a more efficient information sharing environment.

For example, a location of the test results may be automatically attached to the work item to eliminate the need for the test engineer to manually input the network path of the test results, thus allowing the software developer to easily access the test results in the database. State information about the utility, such as information related to one or more manipulations that were performed on the test results by the test engineer when analyzing the test results may also be automatically attached to the work item. When the software developer activates the attachment, the state of the utility may be partially or substantially restored, allowing the software developer to quickly and accurately duplicate the test environment as it was at the time the work item was generated.

One aspect of the present invention includes a computer readable medium encoded with a program for execution on at least one processor and configured to access a database for storing test results generated from testing at least one application, the program, when executed on the at least one processor, performing a method comprising acts of displaying to a user at least one test result stored at a location in the database, receiving an indication from the user to generate a work item associated with the at least one test result, and automatically attaching to the work item, test information associated with the at least one test result.

Another aspect of the present invention includes a software development process comprising act of performing, by at least one test engineer, at least one test on an application to generate at least one test result to be stored in a database, viewing, by the at least one test engineer, the at least one test result via a utility implemented, at least in part, in software, the utility capable of accessing the database, and generating a work item as a result of an indication from the at least one test engineer via at least one interface programmatically coupled to the utility, the at least one interface, when activated, automatically attaching to the work item, test information associated with the at least one test result.

Another aspect of the present invention includes a utility implemented, at least in part, as a software program for accessing test results stored in a database, the test results obtained by performing at least one test on an application, the utility programmatically coupled to at least one bug tracking system to generate one or more work items, the utility comprising at least one first interface adapted to allow a user to select at least one test result from the database for viewing, and at least one second interface programmatically coupled to the at least one first interface, the at least one second interface adapted to allow a user to generate a work item related to the at least one test result, wherein the at least one second interface, when activated, automatically attaches to the work item, test information associated with the at least one test result.

DETAILED DESCRIPTION

A test engineer may utilize one or more interfaces that allow the test engineer to view and/or manipulate test data obtained from testing an application. In particular, a test engineer may employ a utility capable of accessing a database of test results obtained by performing one or more tests on an application being tested for release. The utility may be a simple viewer that renders test results in a relatively understandable manner to a user, or may include more complex functionality, such as one or more interfaces that expose capabilities to permit the test engineer to graph performance data of a desired component, view debug information associated with an error arising from the test, show state information about the application being tested, etc. In response, a test engineer may identify one or more perceived bugs to be brought to the attention of the developer. As discussed above, to alert the developer to the existence of the bug, the test engineer may generate a work item to apply the bug to a bug tracking system.

The term "bug tracking system" refers generally to any system put in place to notify developers that a bug has been identified. A bug tracking system may be implemented at any number of levels of sophistication. A bug tracking system may include or consist of a test engineer sending an e-mail to the appropriate developer(s) with information about the bug, or may be as rudimentary a system as having the test engineer personally notify the developer of the bug and convey verbally any information deemed relevant. More sophisticated bug tracking systems may include a database application that stores and organizes outstanding work items, maintains information about the bugs, indicates the one or more developers to which the bug is assigned, etc. Depending on the sophistication of the database application, an e-mail may be sent to the developer as notification that a bug has been assigned to him or her, or alternatively, developer's may be responsible for proactively checking the database to keep abreast of new work items that have been assigned to them. Any bug tracking system may be used, as the aspects of the invention are not limited in this respect.

Figure 1:
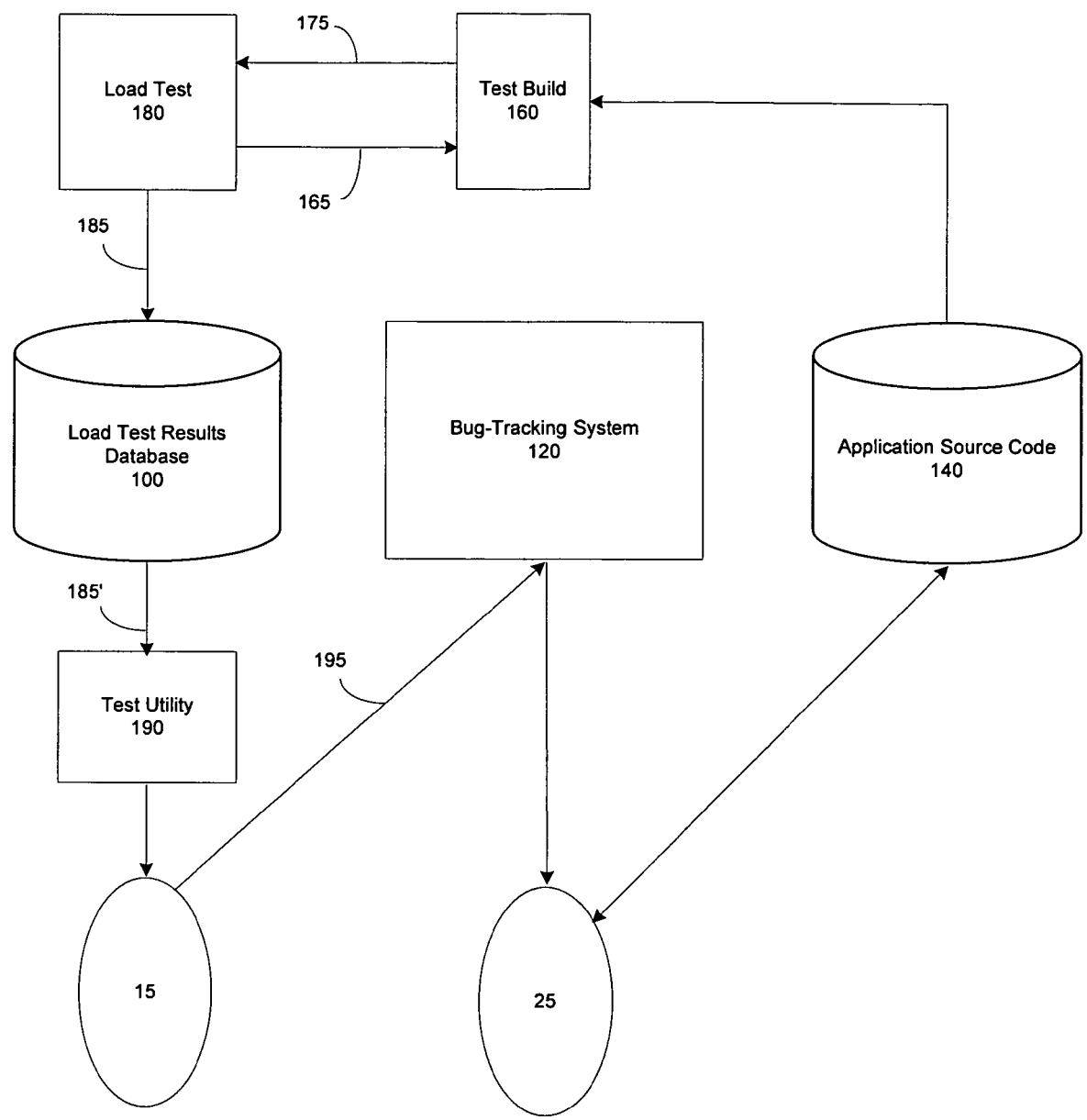
FIG. 1 illustrates a conventional development environment wherein a test engineer manually inputs test information into a work item generated to notify a developer of a bug.

Conventionally, the utility that allows the test engineer to view and/or manipulate test data is separate and distinct from the bug tracking system. As a result, all of the information that a test engineer discovers through testing and wants to convey to the developer must be manually input or communicated by the test engineer to the bug tracking system (and ultimately to the developer). FIG. 1 illustrates one example of a conventional process of reporting bugs identified during a load test in the context of developing a web application.

Application source code 140 may be a database or repository storing the source code for some particular application under development. For example, the source code may build into a web application, one particular version of which is illustrated by test build 160. The web application, for example, may be configured to service multiple concurrent users over a network, such as the Internet. How the application responds to different user loads may be an important metric in determining whether the application is ready for release. Accordingly, a test engineer 15 may be responsible for performing a load test 180 on test build 160. Load test 180 may provide test build 160 with a variety of load conditions 175 and collect performance information 165 about the application under load conditions 175. Load test 180 may then store load test results 185 indicative of the performance information in load test results database 100. Test engineer 15 may then view the load test results via test utility 190. For example, utility 190 may be a program capable of accessing the load test results and displaying load test results 185' (e.g., a selected subset of test results 185) to test engineer 15.

Viewing the load test results (e.g., via utility 190) may result in test engineer 15 identifying one or more bugs exposed by the load test that may need to be addressed by developer 25. Test engineer 15 may proceed to apply a bug report 195 to bug tracking system 120. The term "apply," when used in the context of applying a work item or bug report to a bug tracking system, refers to any necessary actions required to place the work item in the specific channels of the bug tracking system. For example, if the bug tracking system is e-mail based, applying the work item to the bug tracking system may involve sending an e-mail to the appropriate developer(s) with the information that the test engineer wants to convey. In more sophisticated bug tracking systems, applying the work item may involve opening up a new work item, providing information about the bug and saving the work item in a repository accessible by the developer(s).

In FIG. 1, the bug tracking system 120 dictates that the test engineer 15 should e-mail the appropriate developer when bugs are encountered with information that test engineer 15 deems important to facilitate an understanding of the bug so that the developer can address the issue appropriately. In the context of the load test, test engineer 15 may indicate to developer 25 a location in database 100 of the load test results associated with the corresponding load test. In addition, test engineer 15 may provide in the e-mail any additional information that he or she perceives relevant to the bug. Since utility 190 and bug tracking system 120 are not integrated, test engineer 15 must manually attach or embed the information he or she deems relevant when applying the bug to the bug tracking system. For example, test engineer 15 must manually provide test information about the test results (e.g., test engineer 15 manually provides the network path of the load test results and/or input any other information about the bug). Manual manipulation of information by the test engineer is vulnerable to error that may result in incorrect or misleading information being conveyed to the developer. For example, test engineer may provide an incorrect network path to the test results of interest. As a result, a developer may be at a loss when trying to decipher the issue that was identified by the test engineer. In addition, it may also be very time consuming for the test engineer to manually generate and specify information about a bug to be input into a work item.

Applicant has identified and appreciated that errors resulting from the manual application of test information may be reduced or eliminated by having at least some of the test information automatically attached upon generation of a work item. Similarly, work item generation may be made more convenient and time efficient. In one embodiment, a bug tracking system, at least to some extent, is integrated with one or more utilities that permit viewing and/or manipulation of test results. The utility may include one or more interfaces that allow a test engineer to make a gesture to generate a new work item. Since the new work item is created in the context of the utility, test information may be automatically attached to the work item without placing the burden on the test engineer to manually include the test information. For example, a location of test results in a database may be automatically attached to the work item. The location may be provided as a network path to the test results, or may include a link that, when activated, accesses the designated location in the database. The automatic attachment facilitates a developer(s) in duplicating and/or identifying the bug corresponding to the work item to which the location information was attached.

In another embodiment, state information about a utility is automatically attached to a work item. For example, a utility configured to access a test results database may expose capabilities that allow a test engineer to manipulate test results and/or view various aspects of the test results. The various manipulations performed by the test engineer via the utility may be important to a developer who is trying to duplicate and/or understand a bug. By attaching state information about the utility, a developer may substantially restore the state of the utility as it was at the time the bug was identified and/or at the time the work item was generated.

The term "automatically" refers herein to actions that are handled programmatically, for example, by executing instructions on one or more processors that perform the action. Actions performed as a result of a human operator gesturing via one or more interfaces are considered automatic when the actions taken thereafter are performed by a program, software utility, etc. The term "manually" refers herein to actions performed substantially by a human operator or user.

Figure 2:
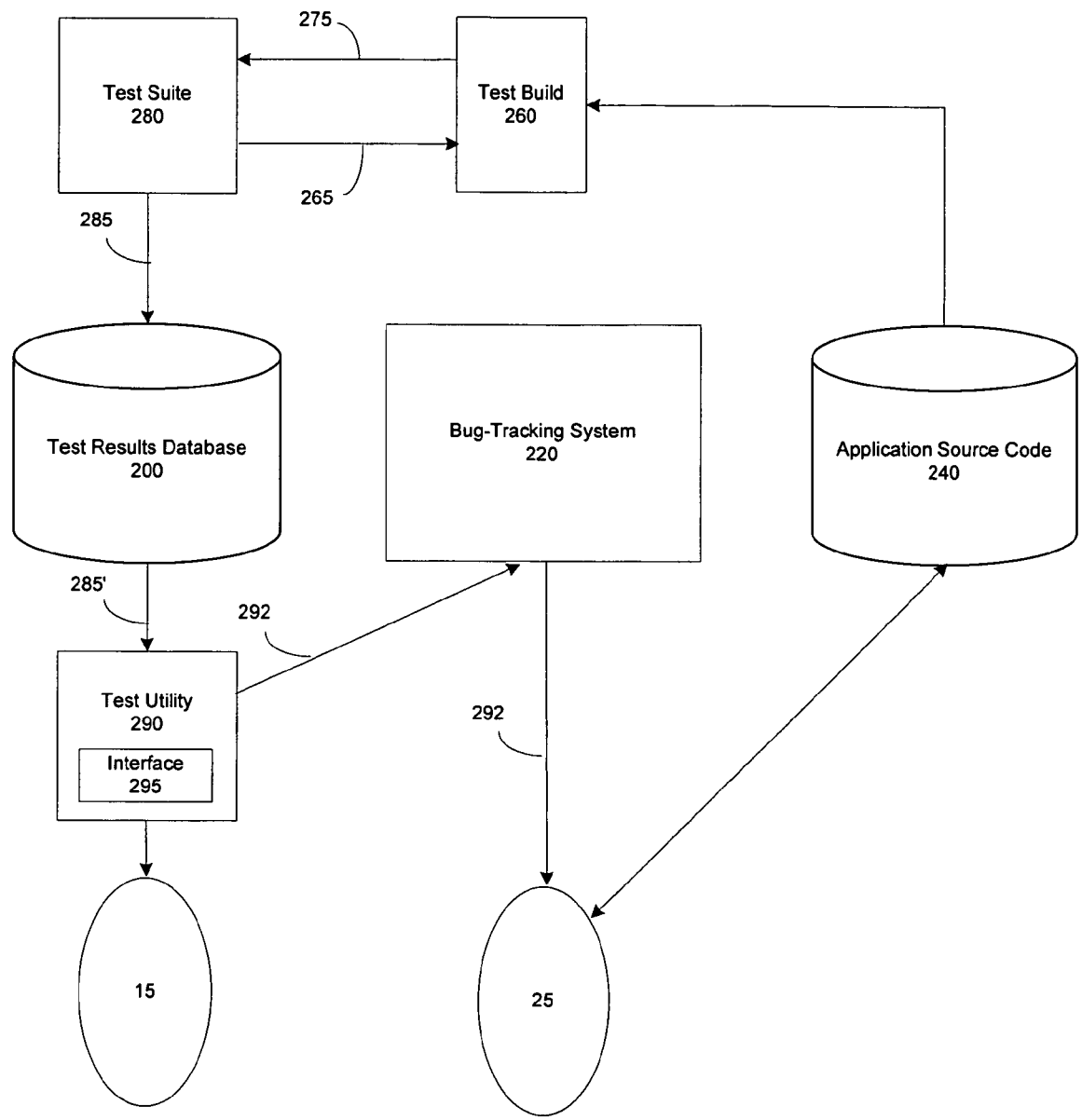
FIG. 2 illustrates a development environment wherein test information is automatically attached to a work item generated to notify a developer of one or more bugs, in accordance with one embodiment of the present invention.

FIG. 2 illustrates a development environment wherein test information is automatically attached to a work item generated by a test engineer and targeted for a developer, in accordance with one embodiment of the invention. A test engineer 15 may be responsible for testing one or more applications being developed. For example, test engineer 15 may be responsible for performing various tests on build 260, a version of an application adapted for use over a network and built from source code 240 written and maintained, at least in part, by developer 25. Test engineer 15 may run any of various tests on build 260, including, but not limited to general error testing, load testing, code coverage analysis, or any test adapted to test the functionality and/or operability of the application. In particular, test suite 280 may include one or multiple tests designed generally to ensure the quality of the application that is ultimately released.

As test suite 280 operates on test build 260 with test inputs 265, the test suite collects information 275 about the application and generates test results 285 related to the performance of the build 260 in response to the tests conducted. Test suite 280 may store the results 285 in test results database 200. Test results database 200 may store information from a number of tests, over multiple applications, for any number of test engineers as described in further detail below. Alternatively, test results database 200 may be dedicated to storing the results from a single test suite in the context of developing a single application, as the aspects of the invention are not limited in this respect.

After conducting one or more desired tests, test engineer 15 may view test results 285' from a particular test of interest using utility 290. Utility 290 may be a simple viewer that renders the test results obtained from database 200 to a display, or may include additional functionality that allows the test engineer to manipulate the test results, organize, categorize and/or display the test results such that the test engineer may make a determination about the performance of the application and/or identify perceived bugs. Utility 290 may include one or more interfaces that allow the test engineer to interact with the test results. For example, utility 290 may include a work item interface 295 that allows a work item to be generated. When test engineer 15 identifies a perceived bug, test engineer 15 may gesture via the work item interface 295 that a new work item should be generated to memorialize the bug.

Work item interface 295 may be any type of interface that allows a user to generate a new work item, for example, work item interface may be any one or combination of windows, icons, menus, and pull down (WIMP) interfaces that perform one or more tasks when activated by user gesture. In addition, any other type of interface such as voice, haptic or other interface may be used, as the aspects of the invention are not limited in this respect. Since utility 290 maintains test information about the test results currently being handled by the utility, work item interface 295 may be configured to automatically attach any such test information to the generated work item. For example, utility 290 may automatically attach location information about the location of the test results currently being viewed or otherwise maintained and/or manipulated via the utility. The term "test information" refers herein to any information related to one or more tests performed on an application to test the applications stability, functionality, viability and/or readiness for release. For example, test information may include, but is not limited to, location information (e.g., a network path, logical or physical address, etc.) about the location of test results in storage, state information about a test utility, debug information, manipulations made to the test results, test input vectors, etc.

In one embodiment, test suite 280 includes a load test adapted to exercise application 260 under a variety of load conditions. Test suite 280 may collect performance data about the operation of the application during the load test and store load test results in database 200. Test engineer 15 may then view and/or manipulate the load test results via test utility 290. Test engineer 15 may conclude from the load test results that one or more issues with the operation of the application should be addressed by developer 25. To notify the developer of the issue, test engineer may generate a new work item via work item interface 295 to apply the work item to the bug tracking system. For example, interface 295 may be a menu item having an "Add New Work Item" selection, or a similarly indicated button provided on a toolbar.

When interface 295 is activated, the interface may execute one or more functions that instantiate a new work item 292 specific to a particular bug tracking system. For example, the interface may launch a new e-mail and automatically attach test information to the message. In particular, information related to the test results that may facilitate the developer in identifying the issue may be automatically attached to the e-mail. For example, a location of the particular load test results in database 200 may be attached to the e-mail so that the developer can access the test results that formed the foundation of the work item. Since the test engineer is accessing the load test results via utility 290, utility 290 may maintain the location of the load test results in database 200. Moreover, since interface 295 is integrated with utility 290, this information may be automatically retrieved and attached to the new work item without requiring the test engineer to retrieve, type or copy and paste the location information (e.g., the network path) into the e-mail.

It should be appreciated that any available test information may be automatically attached to a work item, as the aspects of the invention are not limited for use with any particular type or combination of test information. Automatically attaching test information facilitates quick and efficient generation and application of work items and reduces or eliminates user errors. In addition, burdens on test engineers to manually input test information may be generally alleviated.

As discussed above, a test engineer may be able to view and/or manipulate test results stored in a database via one or more test utilities. It may be desirable during testing to manipulate the test results stored in the database to obtain a better understanding of the test results and, ultimately, to identify any issues with a test build. As a result, test utilities adapted to access test results may include one or more interfaces and associated functionality that facilitates manipulation of the test results. For example, a test engineer may request that certain test data be displayed in a desired manner, organized and grouped according to some criteria, and/or isolated over a particular time interval of the corresponding test.

In conventional development environments, the information about the manipulations and/or steps that the test engineer performed on the test results is typically lost. Because the test utility and the bug tracking system are not integrated, they have no information about one another except for what the test engineer manually provides. As a result, a developer, at best, has information about the location of the raw test results that were manually conveyed by the test engineer. Either the developer will have to analyze the test results on his own, or the test engineer will have to communicate to the developer the manipulations and/or steps that he or she took to arrive at the state where the bug was identified and/or the work item generated.

To facilitate a developer's quick duplication of the information viewed by the test engineer when the bug was identified, the test engineer may describe, either orally or in writing, the steps the test engineer took and/or the manipulations performed during testing. However, such a manual description may be undesirable both because it is vulnerable to error and is inconvenient for the test engineer, requiring relatively significant time investment and diligence on the part of the test engineer to ensure the information is communicated accurately. Even then, the developer must invest the time to follow the directions in order to duplicate the environment as it was at the time the work item was generated.

Applicant has appreciated that by automatically attaching the state of a utility that interfaces with a test results database, developers may duplicate the environment of the test engineer with reduced occurrences of error and with consuming less time resources of both the test engineer and the developer. In one embodiment, a test engineer and a software developer utilize a same test utility (e.g., installed separately on the test engineer and the software developers work station). The test engineer may perform one or more manipulations on given tests-results via the test utility to place the utility and the test results in a particular state. When the test engineer generates a new work item via the test utility, state information indicative of the state of the utility is automatically attached to the work item so that the state may be restored when the developer addresses the work item.

Figure 3:
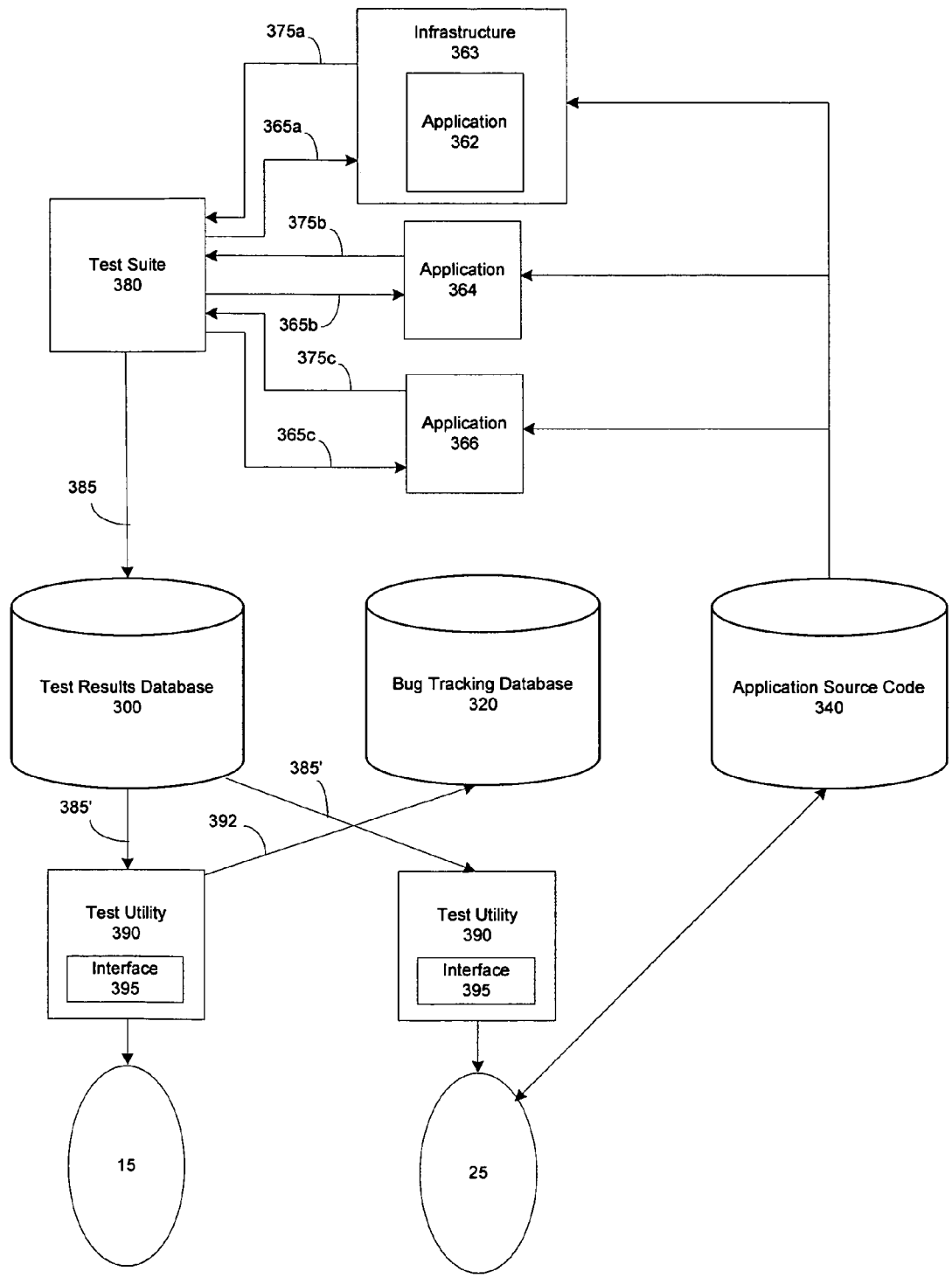
FIG. 3 illustrates a development environment wherein test information is automatically attached to work item generated to notify a developer of one or more bugs, in accordance with another embodiment of the present invention.

FIG. 3 illustrates a development process for testing one or more applications intended, ultimately, for release, according to one embodiment of the present invention. The development environment illustrated in FIG. 3 may be similar to the environment illustrated in FIG. 2. However, test results database 300 may store test results from tests performed on multiple applications. For example, database 300 may be a centralized database (e.g., one or more centralized database servers) utilized by multiple test groups in one or more QA departments, or by multiple test engineers that are part of a single QA team.

Application build 362 and infrastructure 363 may be one or more applications operating over a network and the various network infrastructures used to simulate the environment of the application which the application is intended to operate on upon release to users and/or when the application is made publicly available. Applications 364 and 366 may be one or more standalone applications in various phases of the development cycle. The applications may be tested by different test engineers simultaneously or may be tested by the same test engineers. Each of the applications may respond to same or different respective inputs 365 (i.e., inputs 365a-365c) and respond with respective test data 375 (i.e., data 375a-375c). Test results 385 generated by the various tests in test suite 380 performed (independently or in connection with one another) on each of the applications may be stored in centralized database 300, accessible by the various test engineers authorized to test the applications.

As discussed above, during the course of testing, a test engineer may perform one or more manipulations on selected test results 385' via a test utility to aid in better understanding the test results and to identify any potential issues. Test engineer 15 and developer 25 may utilize the same test utility 390 to access database 300 and manipulate test results. For example, test utility 390 may be an application capable of being executed by both the test engineer 15 and developer 25, either by locally installed instances of the utility or by making the utility available over a network. When test engineer 15 gestures to create a new work item via work item interface 395, interface 395 may automatically save and attach to the work item state information indicating the current state of utility 390. When the developer 25 accesses the work item and, for example, clicks on the attachment, utility 390 may be instantiated with the state information so that the developer is brought to substantially the same state as existed when the work item was generated.

Utility 390 may, via work item interface 395, automatically generate an information rich link to attach to the work item. The link may include information about one or any combination of the location of the test results in database 300, which specific test results were being viewed at some instant in time and in what manner, one or more manipulations performed on the test results via the test utility, values of internal state variables of the utility, etc. The test information (e.g., location information and/or state information) may be attached to the work item in any number of ways, as the aspects of the invention are not limited in this respect. For example, the test information may be automatically embedded in the work item itself. Alternatively, the test information may be stored in database 300 and a link to the location of the test information may be attached to the work item. In either case the test information is made available to the developer without the test engineer manually conveying this information.

In one embodiment, when a developer activates the attachment (e.g., clicks on an attached link) the test information is accessed (within the work item, at the indicated location in the database, etc.), the appropriate utility is launched, the test results accessed and automatically loaded, and the corresponding manipulations automatically performed on the test results such that the state of the utility at the time the work item was generated is automatically duplicated for the developer. State information provided to duplicate the state of the utility may include, but is not limited to, a path to a location where test results are stored, which of these results were being viewed at a given instant in time, one or more manipulations that were performed on the results, the value of one or more variables pertaining to the state of the utility, etc. It should be appreciated that one or any combination of the above exemplary information may be automatically attached to a work item. Moreover, any information that may facilitate duplicating the substance of the state of the utility may be used, as the aspects of the invention are not limited in this respect.

In FIG. 3, the development environment includes a bug tracking system having a database 320 to store work items that have been opened by a test engineer (or alternatively, by a developer or other user) and may have a utility (not shown) that permits users to interact with the stored work items, for example, viewing outstanding work items, listing work items by date of generation, assigned developer or other criteria, etc. New work items may be applied to the database by opening a new work item and saving it to the database. Utility 390 is programmatically coupled to bug tracking database 320. The term "programmatically coupled" refers herein to a coupling wherein a first program is capable of initiating a communication with a second program and automatically transferring information between the first and the second program.

In FIG. 3, a new work item may be generated, populated and saved to the bug tracking database via one or more interfaces that are part of and integrated in utility 390. For example, work item interface 395 allows a new work item to be generated and saved to bug tracking database 320. When a test engineer opens a new work item, test information (e.g., location and/or state information) may be automatically attached and/or embedded in the work item. The test engineer may then have the option of manually attaching additional information to the work item, such as the name and/or e-mail address of the developer to which the work item is to be initially assigned. The test engineer may then save the work item to the bug tracking database 320.

As discussed above, when the developer opens the work item and clicks on the attachment, the state at which the test engineer opened the work item may be substantially restored. For example, clicking on the attachment may launch utility 390 and connect to test results database 300 at the indicated location. The appropriate test results may be obtained from the database and, if indicated by the state information, the results may be further manipulated and displayed to the developer in essentially the same manner as viewed by the test engineer when the work item was generated. By automatically attaching state information, state duplication may be achieved with decreased chance of error and without using the resources of conventional manual transfer of state information from the test engineer to the bug tracking system, and ultimately the developer.

It should be appreciated that since the test utility and the bug tracking system are integrated, any information known to the test utility may be automatically attached to a work item being applied to the bug tracking system. This capability facilitates simple, convenient, error resistant and time preserving information sharing between QA and development. It should be appreciated that any test utility and any bug tracking system may be integrated to implement, to an extent desired, automatic attachment of test information to a work item, as the aspects of the invention are not limited in this respect.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed function. The one or more controller can be implemented in numerous ways, such as with dedicated hardware, or with general purpose hardware (e.g., one or more processor) that is programmed using microcode or software to perform the functions recited above.

It should be appreciated that the various methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code.

In this respect, it should be appreciated that one embodiment of the invention is directed to a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

It should be understood that the term "program" is used herein in a generic sense to refer to any type of computer code or set of instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. The invention is capable of other embodiments and of being practiced or of being carried out in various ways. In particular, various aspects of the invention may be used with any sort of utility that accesses test results and any bug tracking system. Furthermore, any type of information, either alone or in combination with other information may be automatically attached to a work item. The information may be automatically attached in any number of ways such as using links, embedded scripts, programs, etc. Accordingly, the foregoing description, drawings and combinations illustrated therein are by way of example only.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

What is claimed is:

1. A computer storage device encoded with a program for execution on at least one processor and configured to access a database for storing test results generated from testing at least one application, the program, when executed on the at least one processor, performing a method comprising acts of:
    displaying to a user at least one test result stored at a location in the database to facilitate discovering at least one bug, wherein the at least one test result is generated from testing the at least one application and wherein the at least one test result is displayed via a utility configured to permit one or more manipulations to the at least one test result;
    upon the discovery of the at least one bug by the user, receiving an indication from the user to generate a work item associated with the at least one bug, wherein the work item comprises an entry in at least one bug tracking database; and
    automatically attaching to the work item, test information associated with the at least one test result, the test information comprising:
        a link to the location of the at least one test result in the database, wherein the link, when activated, accesses the at least one test result in the database;
        at least one manipulation performed by the user on the at least one test result; and
        state information indicative of a state the utility at a time when the work item is generated.

2. The computer storage device of claim 1, wherein the work item includes at least one email message.

3. A software development process comprising:
    performing, by at least one test engineer, at least one test on an application to generate at least one test result to be stored in a database located on one or more computer readable storage devices;
    viewing, by the at least one test engineer, the at least one test result via a utility to facilitate discovering at least one bug, the utility being implemented, at least in part, in software and capable of accessing the database; performing, by the test engineer, at least one manipulation on the at least one test result via the utility such that the utility is in a first state; and
    upon discovering the at least one bug, generating a work item as a result of an indication from the at least one test engineer via at least one interface programmatically coupled to the utility, the at least one interface, when activated, automatically attaching to the work item, as a link in the work item, test information associated with the at least one bug, the test information comprising a location of the at least one test result in the database and state information corresponding to the first state.

4. The software development process of claim 3, further comprising accessing, by at least one developer, the work item, wherein when the at least one developer activates the link, the state of the utility is at least partially restored.

5. The software development process of claim 4, wherein when the at least one developer activates the link, the at least one manipulation is performed on the at least one test result.

6. An apparatus comprising at least one memory encoded with a software program and at least one processor for executing the program, the apparatus implementing a utility for accessing test results stored in a database, the test results obtained by performing at least one test on an application, the utility programmatically coupled to at least one bug tracking system to generate one or more work items, the utility comprising:
    at least one first interface adapted to allow a user to select at least one test result from the database for viewing to facilitate discovering at least one bug; and
    at least one second interface programmatically coupled to the at least one first interface, the at least one second interface adapted to allow the user, upon discovering the at least one bug, to generate a work item related to the at least one bug, wherein the at least one second interface, when activated, automatically attaches to the work item, test information associated with the at least one test result, the test information comprising a location of the at least one test result in the database and state information associated with a state of the utility at a time when the at least one second interface is activated, wherein the state information comprises information indicative of at least one manipulation performed by the user on the at least one test result.

7. The apparatus of claim 6, wherein the at least one second interface automatically attaches at least one link to the work item, and wherein the at least one link, when activated, accesses the at least one test result stored in the database and at least partially restores the state of the software application.

8. The apparatus of claim 6, wherein the work item includes at least one email message having, as an attachment, the location of the at least one test result.

9. The apparatus of claim 6, wherein the at least one second interface is programmatically coupled to at least one bug tracking database configured to store a plurality of work items, and wherein the at least one second interface is configured to apply the work item to the bug tracking database.

10. An apparatus comprising at least one memory encoded with a software program and at least one processor for executing the program, the apparatus implementing a utility for accessing test results stored in a database, the test results obtained by performing one or more tests on one or more applications, the utility programmatically coupled to at least one bug tracking system to generate one or more work items in the at least one bug tracking system, the utility comprising:

- at least one first interface adapted to allow a user to view one or more test results from the database,
- at least one second interface adapted to allow the user to perform one or more manipulations on the one or more test results to facilitate discovering at least one bug, and
- at least one third interface adapted to allow the user to generate a work item in the at least one bug tracking system in response to discovering the at least one bug, the at least one third interface automatically attaching to the work item at least some state information about the utility at a first time such that, when the work item is accessed at a
- second time, the utility is automatically restored in accordance with the at least some state information including automatically displaying the one or more test results and automatically performing the one or more manipulations on the one or more test results.

* * * * *